United States Patent
Mauser et al.

(10) Patent No.: US 9,436,682 B2
(45) Date of Patent: Sep. 6, 2016

(54) TECHNIQUES FOR MACHINE LANGUAGE TRANSLATION OF TEXT FROM AN IMAGE BASED ON NON-TEXTUAL CONTEXT INFORMATION FROM THE IMAGE

(71) Applicant: Google Inc., Mountain View, CA (US)

(72) Inventors: Arne Mauser, Mountain View, CA (US); Alexander Jay Cuthbert, Oakland, CA (US); John Sturdy DeNero, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/313,670

(22) Filed: Jun. 24, 2014

(65) Prior Publication Data
US 2015/0370785 A1 Dec. 24, 2015

(51) Int. Cl.
*G06K 9/72* (2006.01)
*G06F 17/28* (2006.01)
*G06K 9/00* (2006.01)
*G06K 9/32* (2006.01)

(52) U.S. Cl.
CPC ......... *G06F 17/289* (2013.01); *G06K 9/00671* (2013.01); *G06K 9/3258* (2013.01); *G06K 9/72* (2013.01); *G06K 2209/01* (2013.01)

(58) Field of Classification Search
CPC .................................................. G06F 17/289
See application file for complete search history.

(56) References Cited

U.S. PATENT DOCUMENTS

| | | | |
|---|---|---|---|
| 7,751,805 | B2 | 7/2010 | Neven et al. |
| 8,725,490 | B2 | 5/2014 | Athsani et al. |
| 2008/0221862 | A1 | 9/2008 | Guo et al. |
| 2012/0130704 | A1 | 5/2012 | Lee et al. |
| 2012/0163668 | A1 | 6/2012 | Englund et al. |
| 2013/0108115 | A1* | 5/2013 | Hwang ............... G06K 9/033 382/106 |
| 2013/0114849 | A1* | 5/2013 | Pengelly ............ G06F 17/289 382/103 |
| 2014/0081619 | A1* | 3/2014 | Solntseva ........... G06F 17/289 704/3 |

OTHER PUBLICATIONS

PCT International Search Report and Written Opinion dated Jan. 11, 2016 for PCT International Application No. PCT/US2015/036603 (14 pages).

* cited by examiner

*Primary Examiner* — King Poon
*Assistant Examiner* — Ibrahim Siddo
(74) *Attorney, Agent, or Firm* — Remarck Law Group PLC

(57) ABSTRACT

A computer-implemented technique can include receiving, at a server from a mobile computing device, the server having one or more processors, an image including a text. The technique can include obtaining, at the server, optical character recognition (OCR) text corresponding to the text, the OCR text having been obtained by performing OCR on the image. The technique can include identifying, at the server, non-textual context information from the image, the non-textual context information (i) representing context information other than the text itself and (ii) being indicative of a context of the image. The technique can include based on the non-textual context information, obtaining, at the server, a translation of the OCR text to a target language to obtain a translated OCR text. The technique can include outputting, from the server to the mobile computing device, the translated OCR text.

17 Claims, 5 Drawing Sheets

TECHNIQUES FOR MACHINE LANGUAGE TRANSLATION OF TEXT FROM AN IMAGE BASED ON NON-TEXTUAL CONTEXT INFORMATION FROM THE IMAGE

FIELD

The present disclosure generally relates to optical character recognition (OCR) and machine language translation and, more particularly, to techniques for machine language translation of OCR text from an image based on non-textual context information from the image.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Optical character recognition (OCR) involves the detection of a text in an image using a computing device, e.g., a server. OCR can provide for a faster way to obtain the text in a digital form at a user device, e.g., compared to manual input of the text to the user device by a user. After obtaining the text in the image, the text can be utilized in various ways. For example, the text may be processed by a computing device, stored at a memory, and/or transmitted to another computing device. One example of processing the text is machine language translation, which involves translating the text from a source language to a different target language using a computing device.

SUMMARY

In one aspect, a computer-implemented technique is presented. The technique can include receiving, at a server from a mobile computing device, the server having one or more processors, an image including a text. The technique can include obtaining, at the server, optical character recognition (OCR) text corresponding to the text, the OCR text having been obtained by performing OCR on the image. The technique can include identifying, at the server, non-textual context information from the image, the non-textual context information (i) representing context information other than the text itself and (ii) being indicative of a context of the image. The technique can include based on the non-textual context information, obtaining, at the server, a translation of the OCR text to a target language to obtain a translated OCR text. The technique can also include outputting, from the server to the mobile computing device, the translated OCR text.

In some embodiments, the technique further includes obtaining, at the server, a translation of the OCR text to the target language to obtain a baseline translated OCR text, and adjusting, at the server, the baseline translated OCR text based on the non-textual context information to obtain the translated OCR text.

In other embodiments, the technique further includes determining, at the server, a source language of the text based on the non-textual context information, wherein the translated OCR text is further based on the source language.

In some embodiments, the technique further includes determining, at the server, a type of location at which the image was captured based on the non-textual context information, wherein the translated OCR text is further based on the type of location.

In other embodiments, the technique further includes determining, at the server, a geo-location of the mobile computing device, wherein the translated OCR text is further based on the geo-location of the mobile computing device.

In some embodiments, the technique further includes obtaining, at the server, map information based on the geo-location, and identifying, at the server, points of interest near the geo-location using the map information, wherein the translated OCR text is further based on the points of interest near the geo-location.

In other embodiments, the technique further includes determining, at the server, a user history corresponding to a user of the mobile computing device, wherein the translated OCR text is further based on the user history.

In some embodiments, the non-textual context information includes a font of the text. In other embodiments, the non-textual context information includes at least one of (i) an object in the image and (ii) a shape of the object in the image.

In some embodiments, the non-textual context information includes at least one of a color of the object, and wherein the technique further includes determining, at the server, whether the image was captured indoors or outdoors based on the color of the object, wherein the translated OCR text is further based on whether the image was captured indoors or outdoors.

A server having one or more processors configured to perform operations is also presented. The operations can include receiving, from a mobile computing device, an image including a text. The operations can include obtaining OCR text corresponding to the text, the OCR text having been obtained by performing OCR on the image. The operations can include identifying non-textual context information from the image, the non-textual context information (i) representing context information other than the text itself and (ii) being indicative of a context of the image. The operations can include based on the non-textual context information, obtaining a translation of the OCR text to a target language to obtain a translated OCR text. The operations can also include outputting, to the mobile computing device, the translated OCR text.

In some embodiments, the operations further include obtaining a translation of the OCR text to the target language to obtain a baseline translated OCR text, and adjusting the baseline translated OCR text based on the non-textual context information to obtain the translated OCR text.

In other embodiments, the operations further include determining a source language of the text based on the non-textual context information, wherein the translated OCR text is further based on the source language.

In some embodiments, the operations further include determining a type of location at which the image was captured based on the non-textual context information, wherein the translated OCR text is further based on the type of location.

In other embodiments, the operations further include determining a geo-location of the mobile computing device, wherein the translated OCR text is further based on the geo-location of the mobile computing device.

In some embodiments, the operations further include obtaining map information based on the geo-location, and identifying points of interest near the geo-location using the map information, wherein the translated OCR text is further based on the points of interest near the geo-location.

In other embodiments, the operations further include determining a user history corresponding to a user of the mobile computing device, wherein the translated OCR text is further based on the user history.

In some embodiments, the non-textual context information includes a font of the text. In other embodiments, the non-textual context information includes at least one of (i) an object in the image and (ii) a shape of the object in the image.

In some embodiments, the non-textual context information includes at least one of a color of the object, and wherein the operations further include determining whether the image was captured indoors or outdoors based on the color of the object, wherein the translated OCR text is further based on whether the image was captured indoors or outdoors.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
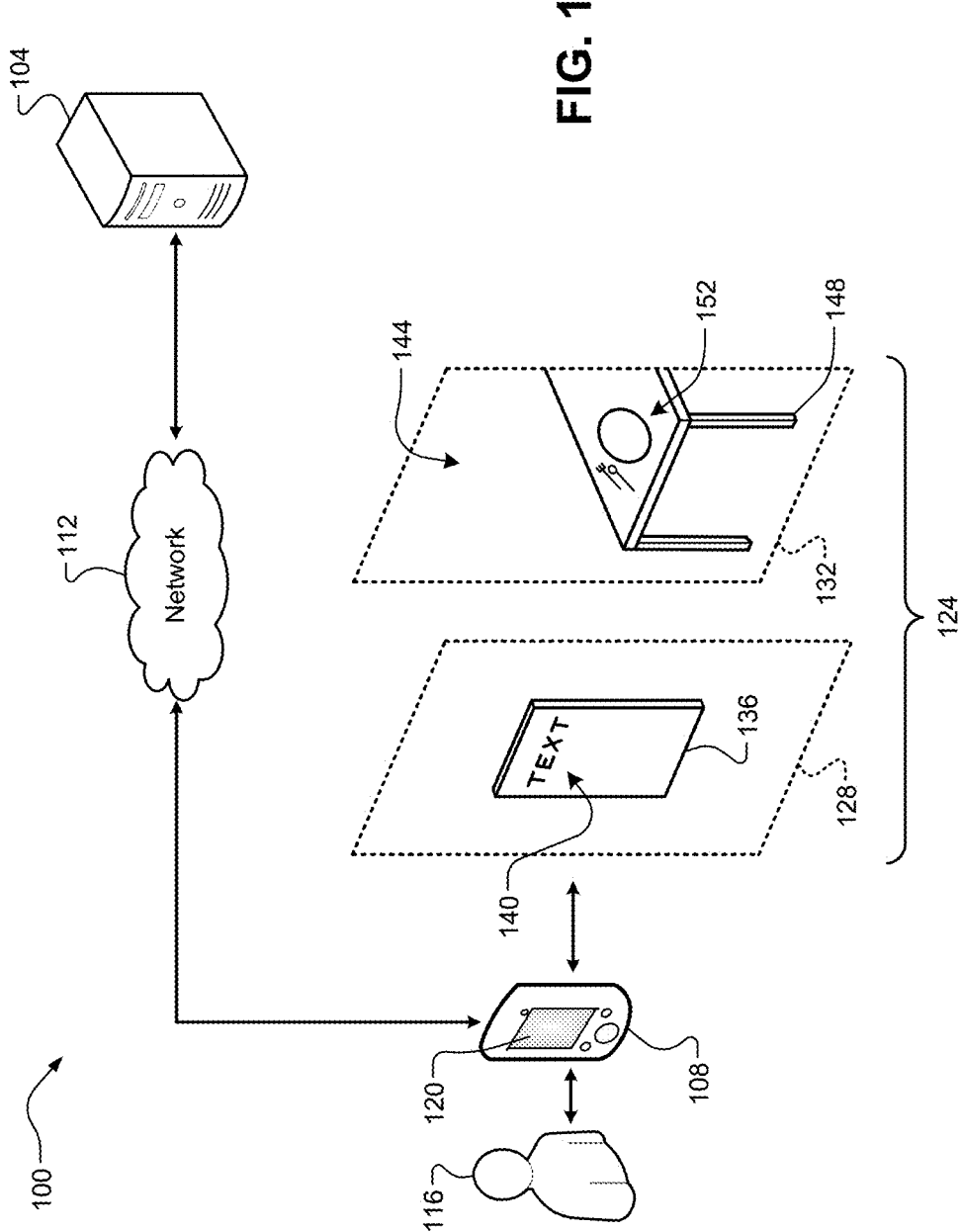
FIG. 1 is a diagram of a computing network including an example server and an example mobile computing device according to some implementations of the present disclosure.

Conventional systems obtain optical character recognition (OCR) text from an image and perform machine language translation the OCR text from its source language to a desired language. Some words and/or phrases, however, may have multiple meanings in certain languages. Each of these multiple meanings may depend on a context of the particular word or phrase. For example, the German word "rind" can mean both "beef" and cow." Conventional systems would translate the OCR text "rind" to either "beef" or "cow" in English, e.g., whichever word has a higher usage rate in English. Also for example, the English phrase "bear right" can mean both "veer," "turn, or "stay" "to the right" as well as "a bear" (the animal) "is to the right." These systems do not account for other information in the image that may be indicative of its context, which can be used to determine the correct meaning and thus obtain the correct or desired translation. Accordingly, techniques are presented for machine language translation of OCR text from an image based on non-textual context information from the image.

As used herein, the term "non-textual context information" refers to any information from the image other than the text itself that is indicative of a context of the image. The non-textual context information includes information (features, objects, etc.) that is extracted from the image itself and is indicative of a context of the image. In other words, the non-textual context information is information extracted or derived from the image (e.g., internal to the image) and not information about the image (e.g., external to the image), such as metadata or other attributes associated with the image or the image file. Examples of the non-textual context information include shapes, colors, and objects, such as features or objects in the background of the image. Non-textual context information can also be obtained from a foreground of the image. Additionally, non-textual context information can also include attributes of the text itself, such as its font.

The techniques can identify this non-textual context information and use the non-textual context information to obtain a translation of an OCR text obtained from the image. The non-textual context information can be obtained using any suitable image processing and feature/object detection techniques. In one implementation, the techniques can obtain a baseline translation of the OCR text and then determine whether to adjust the baseline translation based on the non-textual context information. This can also represent a verification step for the baseline translation. Other information can also be used to further augment these techniques, geo-location of the user's mobile computing device and their past behavior (or "user history"). This information could be indicative of a type of location at which the image was captured, which can be used to augment the non-textual context information identification. Location can also be used to more easily identify the source language.

In situations in which the systems discussed here collect personal information about users, or may make use of personal information, the users may be provided with an opportunity to control whether programs or features collect user information (e.g., information about a user's history, such as their past behavior with respect to a social network, social actions or activities, their profession, and/or their general preferences, and/or information with respect to a user's current geo-location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geo-location may be generalized where location information is obtained (such as to a city, ZIP code, or state level), so that a particular location of a user cannot be determined. Thus, the user may have control over how and whether information is collected about the user and used by a content server.

Referring now to FIG. 1, a computing network 100 is illustrated. The computing network 100 includes a server 104. The term "server" as used herein can refer to both a single hardware computer server and a plurality of similar servers operating in a parallel or distributed architecture. For example only, first and second servers can be implemented for performing OCR and machine language translation, respectively. A mobile computing device 108 is configured to communicate with the servers 104 via a network 112. Examples of the mobile computing device 108 include a laptop computer, a tablet computer, a mobile phone, and wearable technology, such as a smartwatch, eyewear, or other wearable objects that incorporate a computing device. It should be appreciated, however, that the techniques of the present disclosure could be implemented at any computing device having a display and a camera, e.g., a desktop computer. The network 112 can include a local area network (LAN), a wide area network (WAN), e.g., the Internet, or a combination thereof.

The mobile computing device 108 can be associated with a user 116. For example, the user 116 can interact with the mobile computing device 108 via a display 120, e.g., a touch display. The user 116 can use the mobile computing device 108 to capture an image 124 of a scene. The image 124 can include a foreground 128 and a background 132. As shown, the foreground 128 of the image 124 includes an object 136 having a text 140 thereon. In the illustrated example, the scene is a restaurant and the object 136 is a menu. For example only, the user 116 may be holding the object 136 in front of her while capturing the image 124. Other examples of the object 136 include documents, signs, and advertisements. OCR can be performed on the image to detect the text 140. As shown, the background 132 of the image 124 can include non-textual context information 144 comprising a table 148 and dining place setting 152 (plate, fork, knife, spoon, napkin, etc.) arranged on a top surface of the table 148.

After obtaining the text 140, the text 140 can then be translated to a target language, such as a language understood/spoken by the user 116. The OCR and/or the machine language translation can be performed locally (at the mobile computing device 108), remotely (at the server 104), or a combination thereof. For example, the mobile computing device 108 can transmit the image to the server 104 for processing. The server 104 can obtain the OCR text, identify the non-textual context information 144, and obtain a translation of the OCR text. In the illustrated example, the non-textual context information 144 is indicative of the restaurant environment, and thus the server 104 can leverage this knowledge to obtain a translation of the OCR text that corresponds to the restaurant context of the image 124. As previously discussed herein, for example, if the OCR text was "rind," the restaurant context would be indicative of a translation to the English word "beef" instead of the English word "cow."

Figure 2:
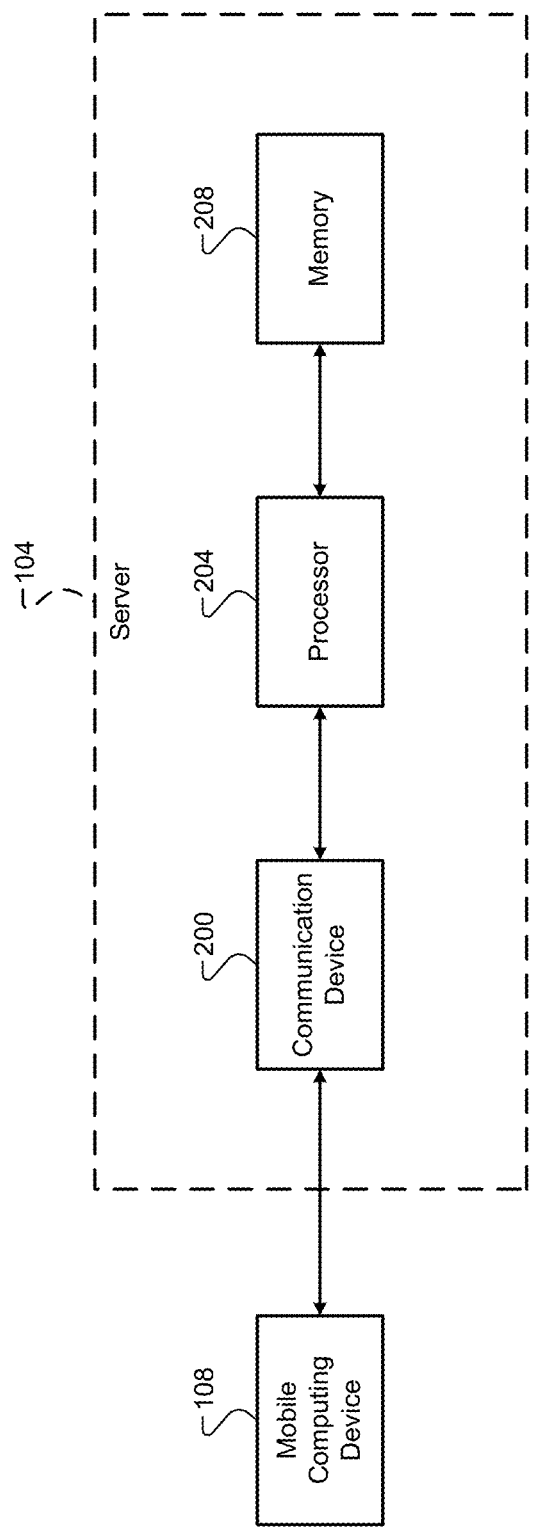
FIG. 2 is a functional block diagram of the example server of FIG. 1.

Referring now to FIG. 2, a functional block diagram of the example server 104 is illustrated. The server 104 can include a communication device 200, a processor 204, and a memory 208. The communication device 200 can include any suitable components (e.g., a transceiver) configured to communicate with other devices, such as the mobile computing device 108, via the network 112. The memory 208 can be any suitable storage medium (flash, hard disk, etc.) configured to store information at the server 104. The processor 204 can control operation of the server 104. Example functions performed by the processor 204 include, but are not limited to, loading/executing an operating system of the server 104, controlling transmission/reception of information via the communication device 200, and controlling read/write operations at the memory 208. The processor 204 can also be configured to execute at least a portion of the techniques of the present disclosure, which are now discussed in greater detail.

The server 104 can receive an image for processing. The image can be received from the mobile computing device 108. In some implementations, the mobile computing device 108 can capture the image, but the image could also be obtained by the mobile computing device 108 from another source. Receipt of the image at the server 104 can represent a request for OCR and machine language translation. Alternatively, the mobile computing device 108 may transmit an explicit request to the server 104 along with the image. The server 104 can perform OCR on the image to obtain OCR text. Any suitable OCR algorithm can be utilized to obtain the OCR text. In some implementations, at least a portion of the OCR can be performed at another device, such as the mobile computing device 108 or another server. After obtaining the OCR text, the server 104 can then continue with the machine language translation techniques of the present disclosure.

In some implementations, the server 104 can obtain a baseline translation of the OCR text, or a "baseline translated OCR text." This baseline translated OCR text can represent a machine language translation of the OCR text from its source language to a target language without accounting for any non-textual context information from the image. The target language can be specified by the mobile computing device 108, such as by an input from or preferences of the user 116. The server 104 can identify any non-textual context information from the image. Any suitable object recognition and/or feature detection techniques can be utilized by the server 104 to identify the non-textual context information. In some implementations, the server 104 can perform machine learning to train a classifier using labeled training sets and then use the trained classifier to identify the non-textual context information. As previously discussed, example non-textual context information includes types of objects, shapes, colors, and text attributes such as fonts.

After identifying the non-textual context information, the server 104 can obtain a translation of the OCR text or a "translated OCR text" based on the non-textual context information. If the baseline translated OCR text was previously obtained, the server 104 can determine whether to adjust the baseline translated OCR text in light of the non-textual context information. For example only, one or more additional translated OCR texts may be generated based on various non-textual context information and then each translated OCR text (including the baseline OCR text) can be compared to each other, such as using corpus-weighted meanings. In addition, other information can also be used to augment the obtaining of the translated OCR text. As previously discussed, examples of this other information include type of location and/or geo-location, as well as user history. In addition, the server 104 may determine whether the image was captured indoors or outdoors. This determination could be based on the non-textual context information, the other information (e.g., geo-location), and/or imaging parameters (ambient lighting, brightness, flash on/off, etc.).

If the non-textual context information indicates that the baseline translated OCR text is incorrect or inaccurate (e.g., an incorrect context), the server 104 can adjust the baseline translated OCR text based on the non-textual context information to obtain a translated OCR text or an "adjusted translated OCR text." Otherwise, the baseline translated OCR text can be utilized. The server 104 can then output the appropriate translated OCR text to the mobile computing device 108 for display to the user 116. The server 104 may additionally or alternatively send the appropriate translated OCR text to another device and/or store the appropriate translated OCR text (e.g., at the memory 208) for learning and/or retrieval during future operations. For example only, the same image, such as a famous sign or landmark, may be repeatedly sent to the server 104 from different user mobile computing devices, and thus the server 104 may be able to determine that these images are the same and then retrieve the appropriate translated OCR text for faster provision to the user mobile computing devices.

Figure 3B:
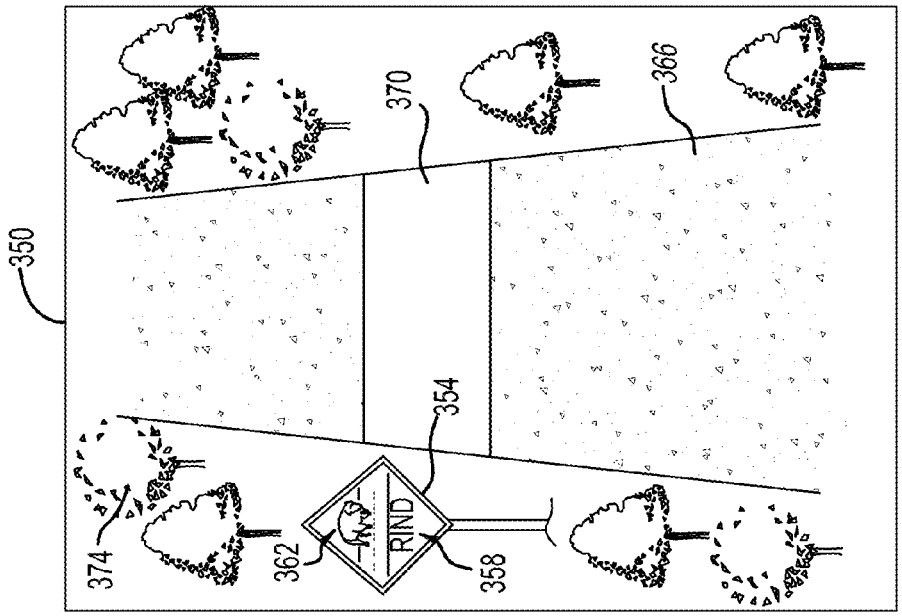
FIGS. 3A-3B illustrate an example pair of images each having a same text but different non-textual context information according to some implementations of the present disclosure.
Figure 3A:
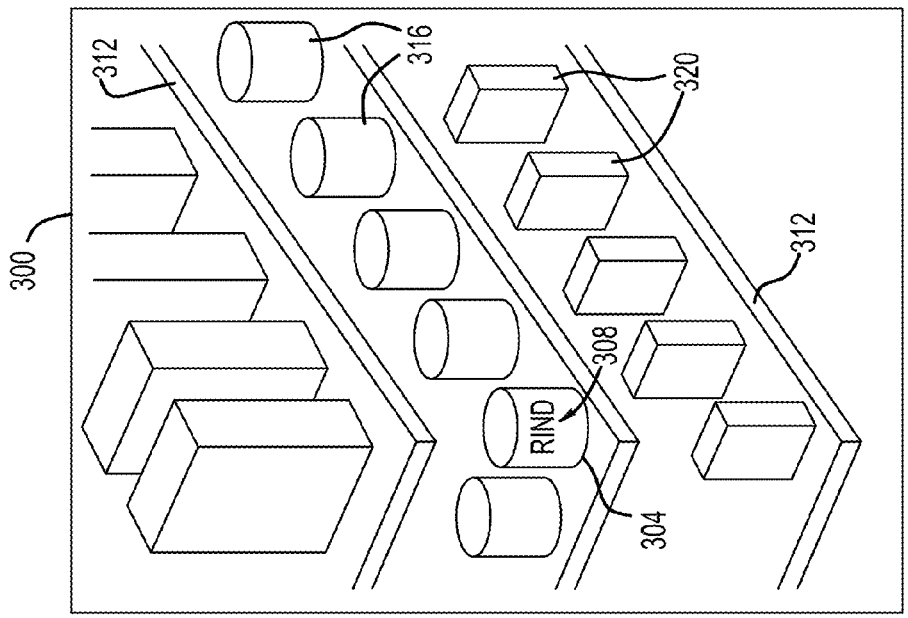

FIGS. 3A-3B illustrate an example pair of images 300, 350 each having a same text but a different context and thus different non-textual context information. Each image 300, 350 includes the text "rind." As previously discussed, the German word "rind" has multiple meanings and corresponds to both the English word "beef" and the English word "cow." Similarly, FIGS. 4A-4B also illustrate an example pair of images 400, 450 each having a same text but a different context and thus different non-textual context information. As previously discussed, the English phrase "bear right" has multiple meanings including a bear (animal) to the right and veer/turn/stay to the right. These different meanings can correspond to multiple translations in non-English languages. Conventional systems would output the same translated OCR texts for each of these image pairs 300, 350 and 400, 450. Because the contexts of these image pairs 300, 350 and 400, 450 are different, however, different translated OCR texts may be necessary.

In the left image 300 of FIG. 3A, the context is a grocery store and a can 304 includes the text 308. The server 104 can identify the non-textual context information from the image 300, which can include, but is not limited to, a shape of the can 304 (cylinder), shelves 312, a plurality of (other) cans 316 (e.g., in rows), and a plurality of other objects 320 (e.g., boxes in rows). Other example non-textual context information that could be indicative of the grocery store context may include labels on food items (e.g., the can 304), a font of the text 312, price tags, and aisle numbers/markers. As previously discussed, the server 104 may also detect that the image 300 was captured indoors, which can be used to determine the grocery store context. The grocery store context is indicative of the meaning "beef" instead of "cow," and thus the appropriate translated OCR text ("beef") can be provided.

In the right image 350 of FIG. 3B, the context is a road crossing and a sign 354 includes the text 358. The server 104 can identify non-textual context information from the image 350, which can include, but is not limited to, a shape of the sign 354 (diamond), illustrations 362 on the sign (a cow crossing a road), a road 366, a crossing 370 of the road 366 (e.g., having a different texture than the road 366, thereby indicative of a crossing), and trees 374. Other example non-textual context information that could be indicative of the road crossing context is a font of the text 358 and one or more cows. For example, signs such as sign 358 may always use specific fonts or sets of fonts, and other objects may also be associated with specific fonts or sets of fonts. The server 104 may also detect that the image 350 was captured outdoors, which can be used to determine the road crossing context. The road crossing context is indicative of the meaning "cow" instead of "beef," and thus the appropriate translated OCR text ("cow") can be provided.

Figure 4B:
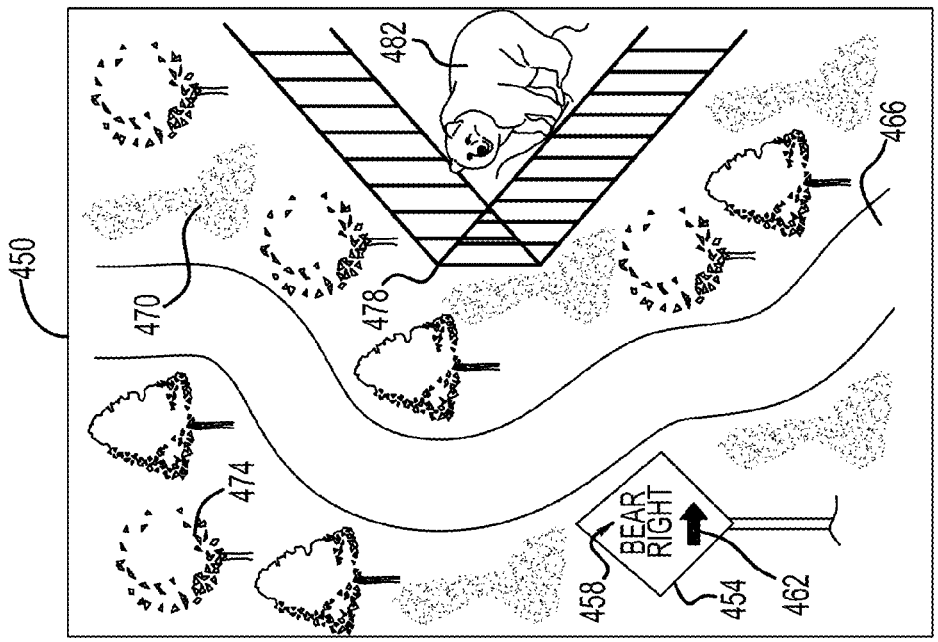
FIGS. 4A-4B illustrate another example pair of images each having a same text but different non-textual context information according to some implementations of the present disclosure.
Figure 4A:
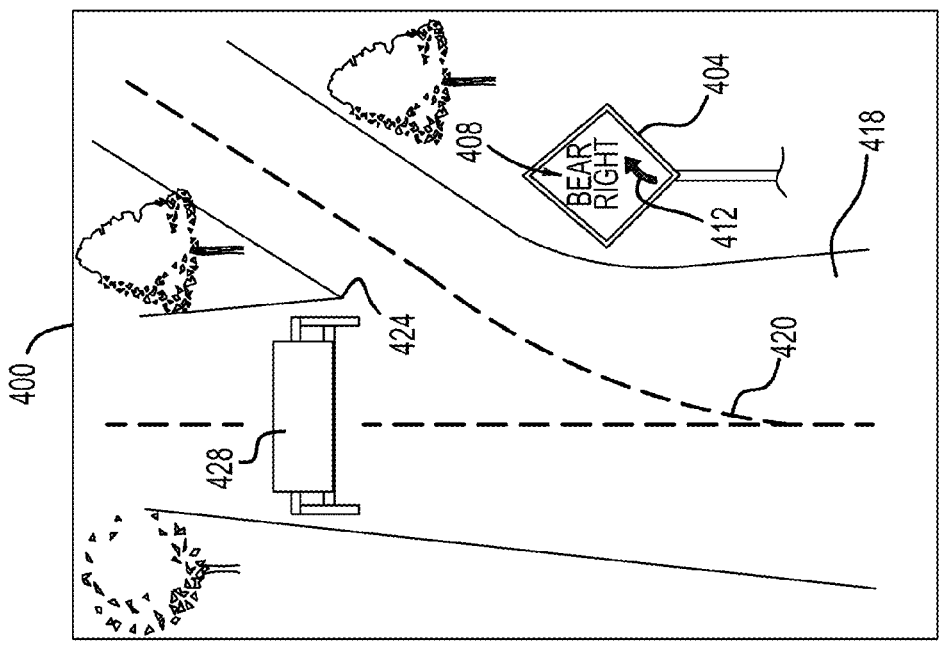

In the left image 400 of FIG. 4A, the context is a road or highway under construction and a sign 404 includes the text 408. The server 104 can identify non-textual context information from the image 400, which can include, but is not limited to, a shape of the sign (diamond, which may be indicative of a road/highway sign), a type or shape of an arrow 412 on the sign 404 (e.g., the curved nature of the arrow 412 may be indicative of the road 420 ahead after the split/division 420), a road or highway 416, lane markers 420, a split or division 424 in the road/highway 416, and a construction barrier 428. Other example non-textual context information that could be indicative of the road/highway construction context is the font of the text 408, other construction signs, construction workers, and colors (e.g., orange may be indicative of construction). The server 104 may also detect that the image 400 was captured outdoors, which can be used to determine the road/highway construction context. The road/highway construction context is indicative of the meaning veer/turn/stay to the right instead of a bear (animal) to the right, and thus the appropriate translated OCR text can be provided.

In the right image 450 of FIG. 4B, the context is a zoo and a sign 454 includes the text 458. The server 104 can identify non-textual context information from the image 400, which can include, but is not limited to, a type or shape of an arrow 462, a path or walkway 466, grass 470, trees 474, a cage 478 having bars, and a bear 482 in the cage 478. Other example non-textual context information that could be indicative of the zoo context is a font of the text 458 (e.g., a fun or child-friendly font), other zoo signs, other animals, other cages, and people (e.g., other children). The server 104 may also detect that the image 400 was captured outdoors, which can be used to determine the zoo context. For example only, the green color of the grass 470 and/or the trees 474 can be indicative of both the outdoor context and, more particularly, the zoo context. The zoo context is indicative of the meaning a bear (animal) to the right instead of veer/turn/stay to the right, and thus the appropriate translated OCR text can be provided.

Figure 5:
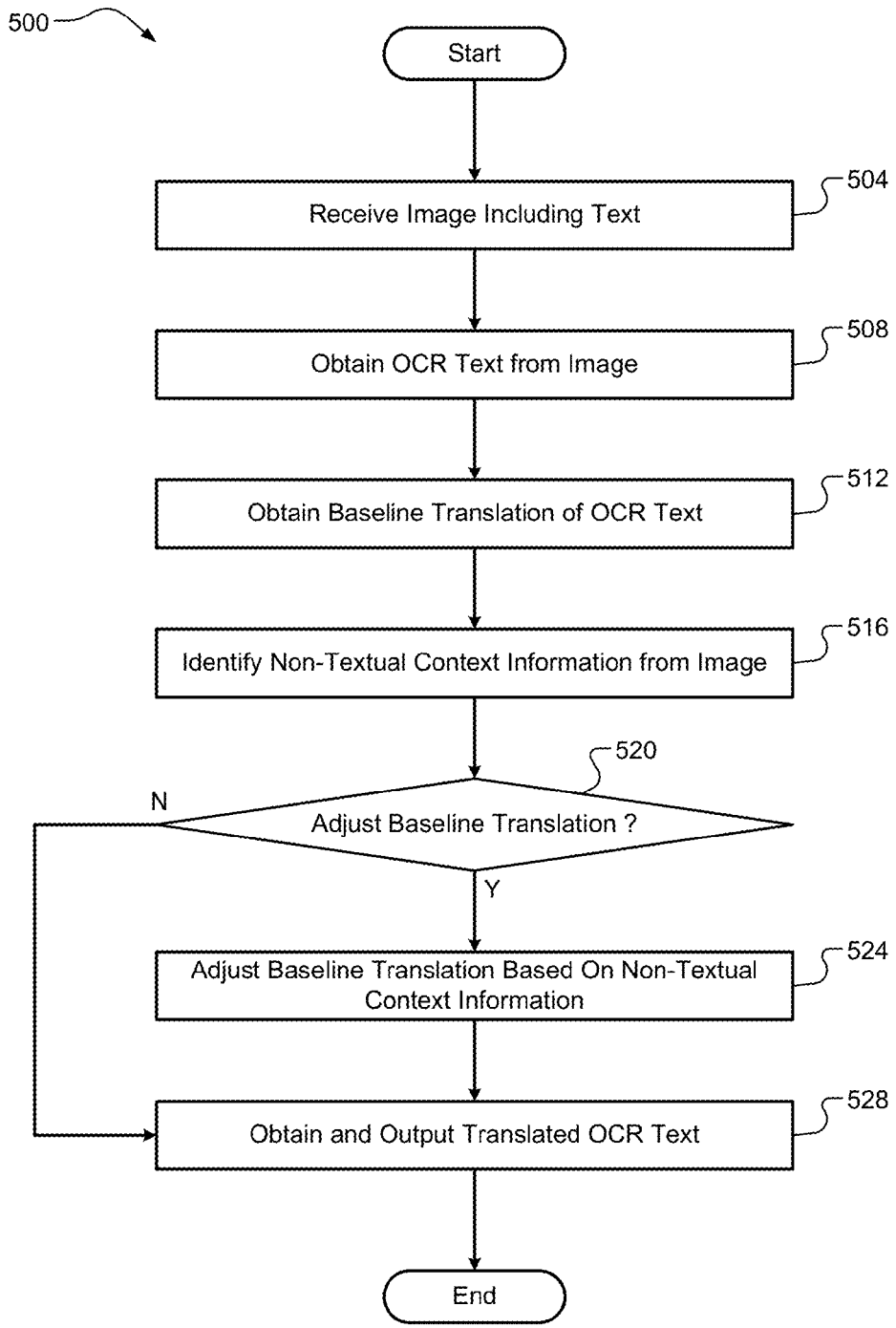
FIG. 5 is a flow diagram of an example technique for machine language translation of OCR text from an image based on non-textual context information from the image according to some implementations of the present disclosure.

Referring now to FIG. 5, a flow diagram of an example technique 500 for machine language translation of OCR text from an image based on non-textual context information from the image is illustrated. At 504, the server 104 can receive an image including a text from the mobile computing device 108. For example, the image may have been captured by the mobile computing device 108. At 508, the server 104 can obtain OCR text corresponding to the text in the image. The OCR can be performed at the server 104, at another server, or some combination thereof. At 512, the server 104 can optionally identify a translation of the OCR text to a target language to obtain a baseline translated OCR text. This baseline translated OCR text can represent a translation of the OCR text without taking into account non-textual context information from the image.

At 516, the server 104 can identify non-textual context information from the image, the non-textual context information (i) representing context information other than the text itself and (ii) being indicative of a context of the image. At 520, the server 104 can determine whether to adjust the baseline translated OCR text based on the non-textual context information. If the baseline translated OCR text should be translated in light of the non-textual context information, the technique 500 can proceed to 524. Otherwise, the technique can proceed to 528. At 524, the server 104 can adjust the baseline translated OCR text based on the non-textual context information to obtain a translated OCR text. For example, the server 104 may obtain a new translation of the OCR text based on the non-textual context information. At 528, the server 104 can output the translated OCR text (or the baseline translated OCR) text to the mobile computing device 108. The technique 500 can then end or return to 504.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a server from a mobile computing device, the server having one or more processors, an image including a text;
obtaining, at the server, optical character recognition (OCR) text corresponding to the text, the OCR text having been obtained by performing OCR on the image;
identifying, at the server, non-textual context information from the image, the non-textual context information (i) representing context information other than the text itself, (ii) being indicative of a context of the image, and (iii) including at least a color of an object in the image;
based on the color of the object, determining, at the server, whether the image was captured indoors or outdoors;
based on (i) the non-textual context information and (ii) whether the image was captured indoors or outdoors, obtaining, at the server, a translation of the OCR text to a target language to obtain a translated OCR text; and
outputting, from the server to the mobile computing device, the translated OCR text.

2. The computer-implemented method of claim 1, further comprising:
obtaining, at the server, a translation of the OCR text to the target language to obtain a baseline translated OCR text; and
adjusting, at the server, the baseline translated OCR text based on the non-textual context information to obtain the translated OCR text.

3. The computer-implemented method of claim 1, further comprising determining, at the server, a source language of the text based on the non-textual context information, wherein the translated OCR text is further based on the source language.

4. The computer-implemented method of claim 1, further comprising determining, at the server, a type of location at which the image was captured based on the non-textual context information, wherein the translated OCR text is further based on the type of location.

5. The computer-implemented method of claim 1, further comprising determining, at the server, a geo-location of the mobile computing device, wherein the translated OCR text is further based on the geo-location of the mobile computing device.

6. The computer-implemented method of claim 5, further comprising:
obtaining, at the server, map information based on the geo-location; and
identifying, at the server, points of interest near the geo-location using the map information,
wherein the translated OCR text is further based on the points of interest near the geo-location.

7. The computer-implemented method of claim 1, further comprising determining, at the server, a user history corresponding to a user of the mobile computing device, wherein the translated OCR text is further based on the user history.

8. The computer-implemented method of claim 1, wherein the non-textual context information includes a font of the text.

9. The computer-implemented method of claim 1, wherein the non-textual context information includes a shape of the object.

10. A server having one or more processors configured to perform operations comprising:
receiving, from a mobile computing device, an image including a text;
obtaining optical character recognition (OCR) text corresponding to the text, the OCR text having been obtained by performing OCR on the image;
identifying non-textual context information from the image, the non-textual context information (i) representing context information other than the text itself, (ii) being indicative of a context of the image, and (iii) including at least a color of an object in the image;
based on the color of the object, determining whether the image was captured indoors or outdoors;
based on (i) the non-textual context information and (ii) whether the image was captured indoors or outdoors, obtaining a translation of the OCR text to a target language to obtain a translated OCR text; and
outputting, to the mobile computing device, the translated OCR text.

11. The server of claim 10, wherein the operations further comprise:
obtaining a translation of the OCR text to the target language to obtain a baseline translated OCR text; and
adjusting the baseline translated OCR text based on the non-textual context information to obtain the translated OCR text.

12. The server of claim 10, wherein the operations further comprise determining a source language of the text based on the non-textual context information, wherein the translated OCR text is further based on the source language.

13. The server of claim 10, wherein the operations further comprise determining a type of location at which the image was captured based on the non-textual context information, wherein the translated OCR text is further based on the type of location.

14. The server of claim 10, wherein the operations further comprise determining a geo-location of the mobile computing device, wherein the translated OCR text is further based on the geo-location of the mobile computing device.

15. The server of claim 14, wherein the operations further comprise:
obtaining map information based on the geo-location; and
identifying points of interest near the geo-location using the map information,
wherein the translated OCR text is further based on the points of interest near the geo-location.

16. The server of claim 10, wherein the operations further comprise determining a user history corresponding to a user of the mobile computing device, wherein the translated OCR text is further based on the user history.

17. The server of claim 10, wherein the non-textual context information includes at least one of (i) a font of the text and (ii) a shape of the object.

* * * * *